Figure 1:
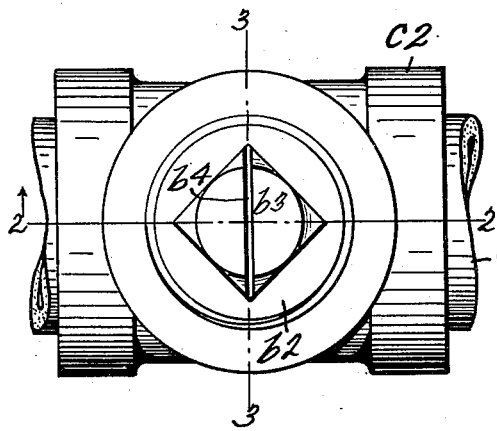

W. H. CURTIN.
FLUID CONDUIT THROTTLE.
APPLICATION FILED MAY 24, 1910.

1,043,403.

Patented Nov. 5, 1912.

Witnesses:
George F. Bentley
F. Eiche

Inventor
William H. Curtin
By his Attorney
J. Chris Larsen

COLUMBIA PLANOGRAPH CO., WASHINGTON, D. C.

UNITED STATES PATENT OFFICE.

WILLIAM H. CURTIN, OF BROOKLYN, NEW YORK.

FLUID-CONDUIT THROTTLE.

1,043,403.

Specification of Letters Patent.

Patented Nov. 5, 1912.

Application filed May 24, 1910. Serial No. 563,080.

*To all whom it may concern:*

Be it known that I, WILLIAM H. CURTIN, a citizen of the United States of America, and residing at Brooklyn, in the county of Kings and State of New York, have invented certain new and useful Improvements in Fluid-Conduit Throttles, of which the following is a specification, such as will enable those skilled in the art to which it appertains to make and use the same.

This invention relates to fluid conduit throttles, being particularly adapted for use in connection with hot-water heating systems, and the object thereof is to provide means for limiting the flow of fluids therethrough without the necessity for using costly valves; a further object is to produce this result by means of a gate movable across said conduit or rotatable therein whereby the area of flow is correspondingly affected; a further object is to employ such a gate in a T-connection of the usual construction; a further object is to provide means within such a connection whereby the fluid flow therethrough may be entirely stopped if desired; and a further object is to provide such a fluid control which is very simple in construction, installation, and use, and which is very economical.

My invention is fully described in the following specification, of which the accompanying drawings form a part, in which the separate parts are designated by the same reference characters in each of the views, and in which:—

Figure 2:
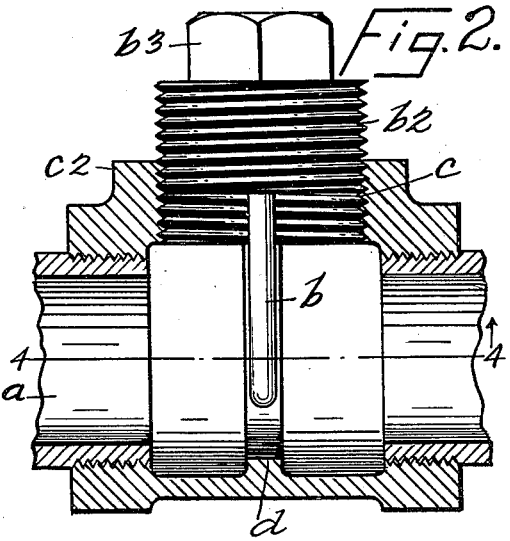
Figure 3:
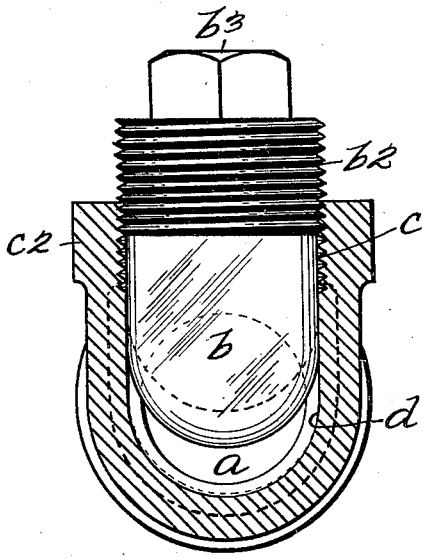
Figure 4:
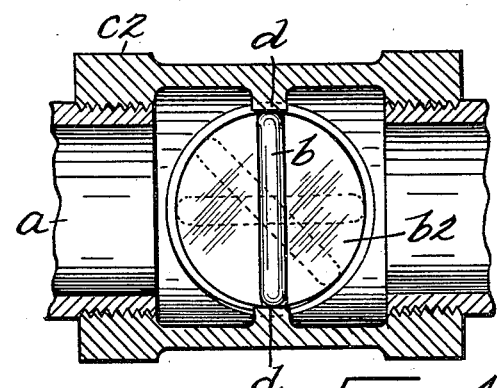

Figure 1 is a top view of my device in operative position; Fig. 2 is a section on the line 2—2 of Fig. 1; Fig. 3 is a section on the line 3—3 of Fig. 1; and Fig. 4 is a section on the line 4—4 of Fig. 2.

In the drawings forming a part of this application I have shown a fluid conduit $a$ intercepted by means of a gate $b$ carried by a screw-threaded plug $b^2$ engaged by the interior screw thread $c$ of an ordinary T-connection $c^2$, said plug being provided with a projection $b^3$ adapted to be engaged by means of a wrench or suitable key to rotate said plug.

When used in connection with heating systems my device is placed adjacent a branch from the main or feed pipe in order to insure a proper flow of the hot fluid to any radiators which may be on such branch, it being a common experience to have such radiators cut out by the tendency of the hot fluid to rise in the main pipe and pass the branch without any appreciable flow therethrough, but, by means of my device, I throttle the flow in the main pipe or riser and, by reducing the speed thereof, insure a proper feed through said branch and any radiators thereon are thereby rendered efficient in operation.

In installing my device all that is necessary is to break the conduit $a$ and insert the T-connection, this being a very simple and inexpensive operation, after which the plug $b^2$ is screwed into the said connection sufficiently far to accomplish the desired result and, in practice, I provide the exterior of the said plug with a mark $b^4$ which serves as an index to the angle of the gate $b$ with reference to the direction of flow and, when the plug is so adjusted, it is not necessary to again change the position thereof and it will thus be seen that my device avoids the use of costly valves at necessary points and has the added advantage of not being readily moved by unskilled persons, or those not provided with a proper key, when once properly set.

To meet certain conditions where it may become necessary to entirely stop the fluid flow, I may change the construction of the T-connection slightly, either by increasing the diameters of the bore $c$ and of the plug $b^2$ to equal the internal diameter of the connection, or by providing, as shown in the drawings, a seat $d$ for the gate $b$ and of the same transverse dimension, this seat being either integral, as shown, or separable, thus permitting the gate to entirely close the conduit, this addition to the connection $c^2$ not being necessary, however, under the usual conditions in the use of my device.

It will be understood that the plug is sealed in the connection in the usual manner by means of red lead or the like, thus preventing leakage and also uncalled for tampering therewith, and I also prefer to locate the devices, as far as possible, in places not readily accessible in order to overcome the liability of tampering and, to still further insure immunity from such tampering, I may also make the projection of a particular shape whereby only a corresponding key will produce plug rotation, or I may arbitrarily recess the said plug and dispense with the said projection.

It will thus be seen that I provide a device, inexpensive in manufacture and installation, which produces the results but saves the expense of the usual costly valves and which, when once set, is immovable except by means of a suitable tool or key; I also provide a gate which is adjustable transversely of the conduit in which it is placed, thus affording great latitude in amount and degree of adjustment, but which may also be fully opened by a turn of 90 degrees from full closure for emergencies or for adjustment and, while I have shown one specific form of construction, it will be obvious that many modifications thereof may be made and still be within the spirit of my invention and, with a reservation to myself of all such modifications and changes,

What I claim as new, and desire to secure by Letters Patent, is:—

In a fluid conduit, a casing having two opposite screw-threaded openings and a screw-threaded opening arranged therebetween and at an angle thereto, a screw-threaded plug engaged in said last named opening, a plate secured to said plug and having a semi-circular end and parallel sides, and said casing having an internal rib of the same conformation as said plate and serving as a seat therefor to prevent flow of fluid while permitting said plate to revolve therein.

In testimony that I claim the foregoing as my invention I have signed my name in presence of the subscribing witnesses this 23rd day of May 1910.

WILLIAM H. CURTIN.

Witnesses:
GEORGE F. BENTLEY,
J. C. LARSEN.

Copies of this patent may be obtained for five cents each, by addressing the "Commissioner of Patents Washington, D. C."